United States Patent
Dobaczewski (10) Patent No.: US 11,928,057 B2
(45) Date of Patent: Mar. 12, 2024

(54) SYSTEM AND METHOD FOR USING VIRTUAL ADDRESSING TO EXECUTE APPLICATION IMAGES

(71) Applicant: Cypress Semiconductor Corporation, San Jose, CA (US)

(72) Inventor: Jacek Dobaczewski, San Jose, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 17/844,583

(22) Filed: Jun. 20, 2022

(65) Prior Publication Data

US 2023/0236962 A1    Jul. 27, 2023

Related U.S. Application Data

(60) Provisional application No. 63/303,904, filed on Jan. 27, 2022.

(51) Int. Cl.
*G06F 12/08* (2016.01)
*G06F 8/61* (2018.01)
*G06F 12/02* (2006.01)

(52) U.S. Cl.
CPC ........... *G06F 12/08* (2013.01); *G06F 8/63* (2013.01); *G06F 12/0246* (2013.01)

(58) Field of Classification Search
None
See application file for complete search history.

(56) References Cited

U.S. PATENT DOCUMENTS

2022/0179756 A1\* 6/2022 Fan .................. G06F 11/1469

\* cited by examiner

*Primary Examiner* — Charles J Choi
(74) *Attorney, Agent, or Firm* — Cooper Legal Group LLC (57) ABSTRACT

One or more computing devices, systems, and/or methods are provided. In an example, a method comprises storing a first application image and a second application image in an application image memory, designating the first application image as active, receiving a first address for accessing the application image memory from a processor, modifying the first address based on a first offset between a base starting address of the first application image and a starting physical address of the first application image in the application image memory to generate a second address, and accessing the application image memory using the second address.

20 Claims, 5 Drawing Sheets

SYSTEM AND METHOD FOR USING VIRTUAL ADDRESSING TO EXECUTE APPLICATION IMAGES

BACKGROUND

Some processors execute an application image that is stored in non-volatile memory, where it can be executed in place (XIP) rather than copying the application software to volatile memory during system initialization to allow for execution. To allow over the air updates of the application software and recovery from update errors two copies are stored in the non-volatile memory to allow one copy to be updated while the other is retained.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a system is provided. The system comprises a processor, and an application image memory storing a first application image, a second application image, a first offset between a base starting address of the first application image and a physical starting address of the first application image in the application image memory, a second offset between a base starting address of the second application image and physical a starting address of the second application image in the application image memory, and an active image identifier indicating one of the first application image or the second application image as being an active application image. A virtual memory controller is configured to receive a first address for accessing the application image memory from the processor, modify the first address based on an active image offset to generate a second address, and access the memory based on the second address. The active image offset comprises the first offset responsive to the first application image being the active application image, and the active image offset comprises the second offset responsive to the second application image being the active application image.

In an embodiment of the techniques presented herein, a system is provided. The system comprise means for storing a first application image and a second application image in an application image memory, mean for designating the first application image as active, means for receiving a first address for accessing the application image memory from a processor, means for modifying the first address based on a first offset between a base starting address of the first application image and a starting physical address of the first application image in the application image memory to generate a second address, and means for accessing the application image memory using the second address.

In an embodiment of the techniques presented herein, a method is provided. The method comprises storing a first application image and a second application image in an application image memory, designating the first application image as active, receiving a first address for accessing the application image memory from a processor, modifying the first address based on a first offset between a base starting address of the first application image and a starting physical address of the first application image in the application image memory to generate a second address, and accessing the application image memory using the second address.

In an embodiment of the techniques presented herein, a system is provided. The system comprises means for storing a first application image in a non-volatile application image memory, means for storing a second application image in the non-volatile application image memory, means for storing in the non-volatile application image memory a first offset between a base starting address of the first application image and a first physical starting address of the first application image in the non-volatile application image memory, means for storing in the non-volatile application image memory a second offset between a base starting address of the second application image and a second physical starting address of the second application image in the non-volatile application image memory, means for storing in the non-volatile application image memory an active image identifier indicating one of the first application image or the second application image as being active, and means for configuring a virtual memory controller configured to modify a first address received from a processor to generate a second address for accessing the non-volatile application image memory based on the first offset responsive to the first application image being active or based on the second offset responsive to the second application image being active.

In an embodiment of the techniques presented herein, a method is provided. The method comprises storing a first application image in a non-volatile application image memory, storing a second application image in the non-volatile application image memory, storing in the non-volatile application image memory a first offset between a base starting address of the first application image and a first physical starting address of the first application image in the non-volatile application image memory, storing in the non-volatile application image memory a second offset between a base starting address of the second application image and a second physical starting address of the second application image in the non-volatile application image memory, storing in the non-volatile application image memory an active image identifier indicating one of the first application image or the second application image as being active, and configuring a virtual memory controller configured to modify a first address received from a processor to generate a second address for accessing the non-volatile application image memory based on the first offset responsive to the first application image being active or based on the second offset responsive to the second application image being active.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

According to some embodiments, an application image memory is used in an execute-in-place technique to store multiple application images. An offset for each application image is stored in a configuration data section of the application image memory reflecting a difference between a base starting address of the application image and a physical starting address of the application image in the application image memory. One of the application images is designated as active and a virtual memory controller is configured based on the offset of the active application image to receive an address for accessing the application image memory from a processor and modify the address based on the offset to access the application image memory. A non-active application image may be updated and then designated as active and the system may be reset to use the updated image.

Figure 1:
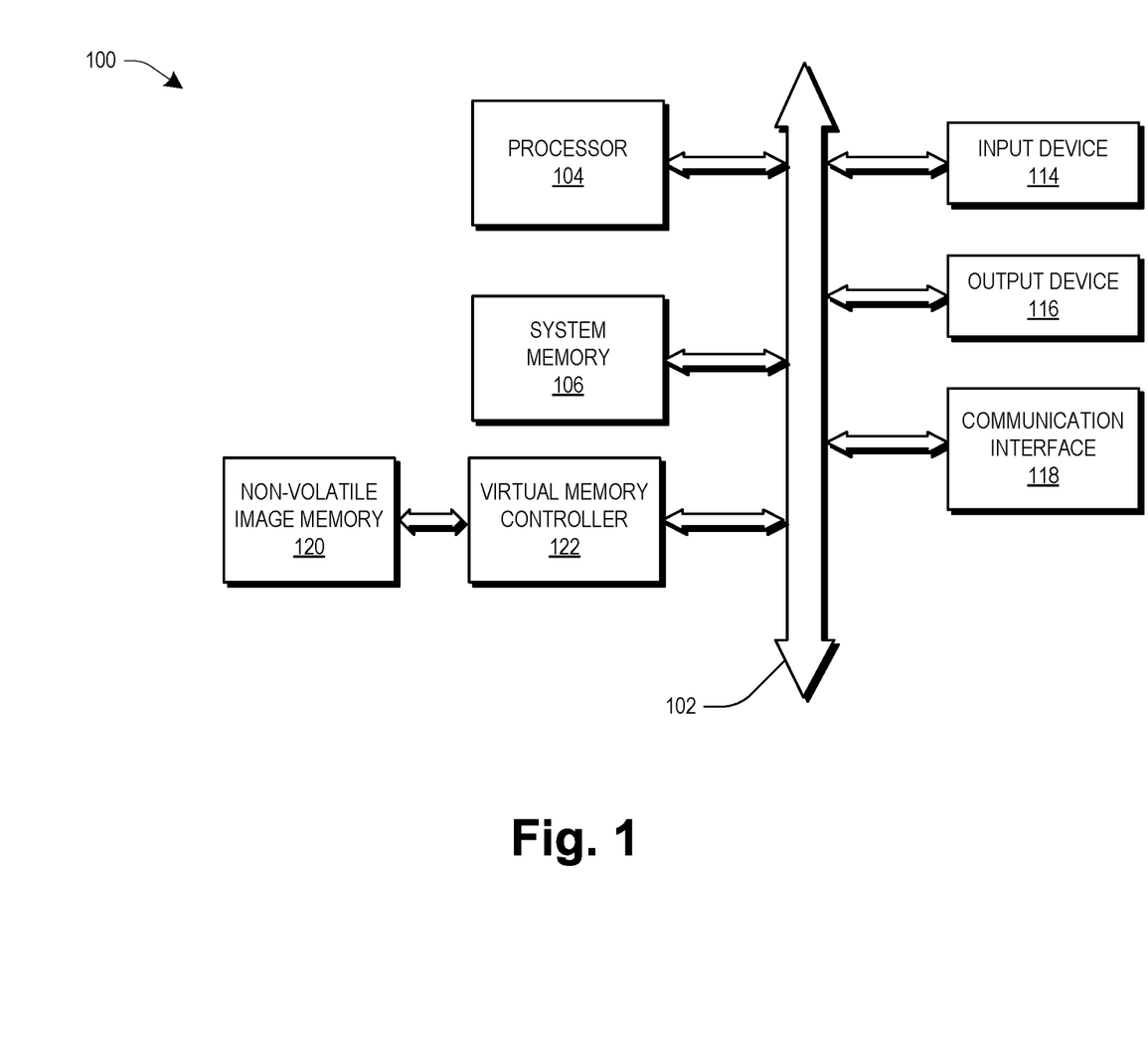
FIG. 1 is a diagram of a processing unit, in accordance with some embodiments.

FIG. 1 is a diagram of a system 100, in accordance with some embodiments. In some embodiments, the system 100 comprises a bus 102, a processor 104, a system memory 106, an input device 114, an output device 116, a communication interface 118, a non-volatile application image memory 120, and a virtual memory controller 122. The system 100 may include fewer components, additional components, different components, and/or a different arrangement of components than those illustrated in FIG. 1.

According to some embodiments, the bus 102 includes a path that permits communication among the components of the system 100. For example, the bus 102 may include a system bus, an address bus, a data bus, and/or a control bus. The bus 102 may also include bus drivers, bus arbiters, bus interfaces, and so forth. The processor 104 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 104 may be implemented as hardware (e.g., a microprocessor, etc.), a combination of hardware and software (e.g., a SoC, an ASIC, etc.), may include one or multiple memories (e.g., cache, etc.), etc.

In some embodiments, the system memory 106 includes one or multiple memories and/or one or multiple other types of storage mediums. For example, the system memory 106 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The system memory 106 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The system memory 106 may include drives for reading from and writing to the storage medium. The system memory 106 may be external to and/or removable from the system 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The system memory 106 may store data, software, and/or instructions related to the operation of the system 100.

The non-volatile application image memory 120 stores application images for use by the processor 104. The non-volatile application image memory 120 retains its data even if power is removed. The non-volatile application image memory 120 may include PROM, flash memory, phase-change memory (PCM), resistive memory (ReRAM), magneto-resistive memory (MRAM), ferroelectric memory (FeRAM), or some other type of non-volatile memory. The non-volatile application image memory 120 may span multiple physical memory devices. Although the system memory 106 may include non-volatile memory, the system memory 106 and the non-volatile application image memory 120 are distinguished by the type of data stored rather than the memory topology.

In some embodiments, the processor 104 controls the overall operation or a portion of the operation(s) of the system 100. The processor 104 performs one or multiple operations based on an operating system and/or various applications or computer programs (e.g., software). In some embodiments, the processor 104 uses an execute-in-place (XIP) technique to execute an application image directly from the non-volatile application image memory 120 as opposed to copying the application image to the system memory 106 during the boot process and executing the application image from the system memory 106. The application images are primarily static, but the non-volatile application image memory 120 can be updated, for example with a new version of the application image or a patch to the application image. In some embodiments, a new version or patch may be received from a remote device or service over the communication interface 118 For XIP operation, the processor 104 stores volatile data, such as variables and instruction pointers in the system memory 106. The processor 104 may perform an operation and/or a process based on various techniques including, for example, multithreading, parallel processing, pipelining, interleaving, etc.

In some embodiments, the input device 114 permits an input into the system 100. For example, the input device 114 may comprise a keyboard, a mouse, a display, a touchscreen, a touchless screen, a button, a switch, an input port, speech recognition logic, and/or some other type of suitable visual, auditory, or tactile input component. The output device 116 permits an output from the system 100. For example, the output device 116 may include a speaker, a display, a touchscreen, a touchless screen, a projected display, a light, an output port, and/or some other type of suitable visual, auditory, or tactile output component.

The communication interface 118 permits the system 100 to communicate with other devices, networks, systems, sensors, and/or the like on a network to send or receive data, such as updates or patches to application images for storage in the non-volatile application image memory 120. The communication interface 118 may include one or multiple wireless interfaces and/or wired interfaces. For example, the communication interface 118 may include one or multiple transmitters and receivers, or transceivers. The communication interface 118 may operate according to a protocol stack and a communication standard. In some embodiments, the communication interface 118 includes an antenna. The communication interface 118 may include various processing logic or circuitry (e.g., multiplexing/de-multiplexing, filtering, amplifying, converting, error correction, etc.). In some embodiments, the communication interface 118 operates using a long range wireless protocol, such as a cellular protocol or a WiFi protocol, a short range protocol, such as BLUETOOTH™, or a wired protocol, such as Ethernet.

Figure 2:
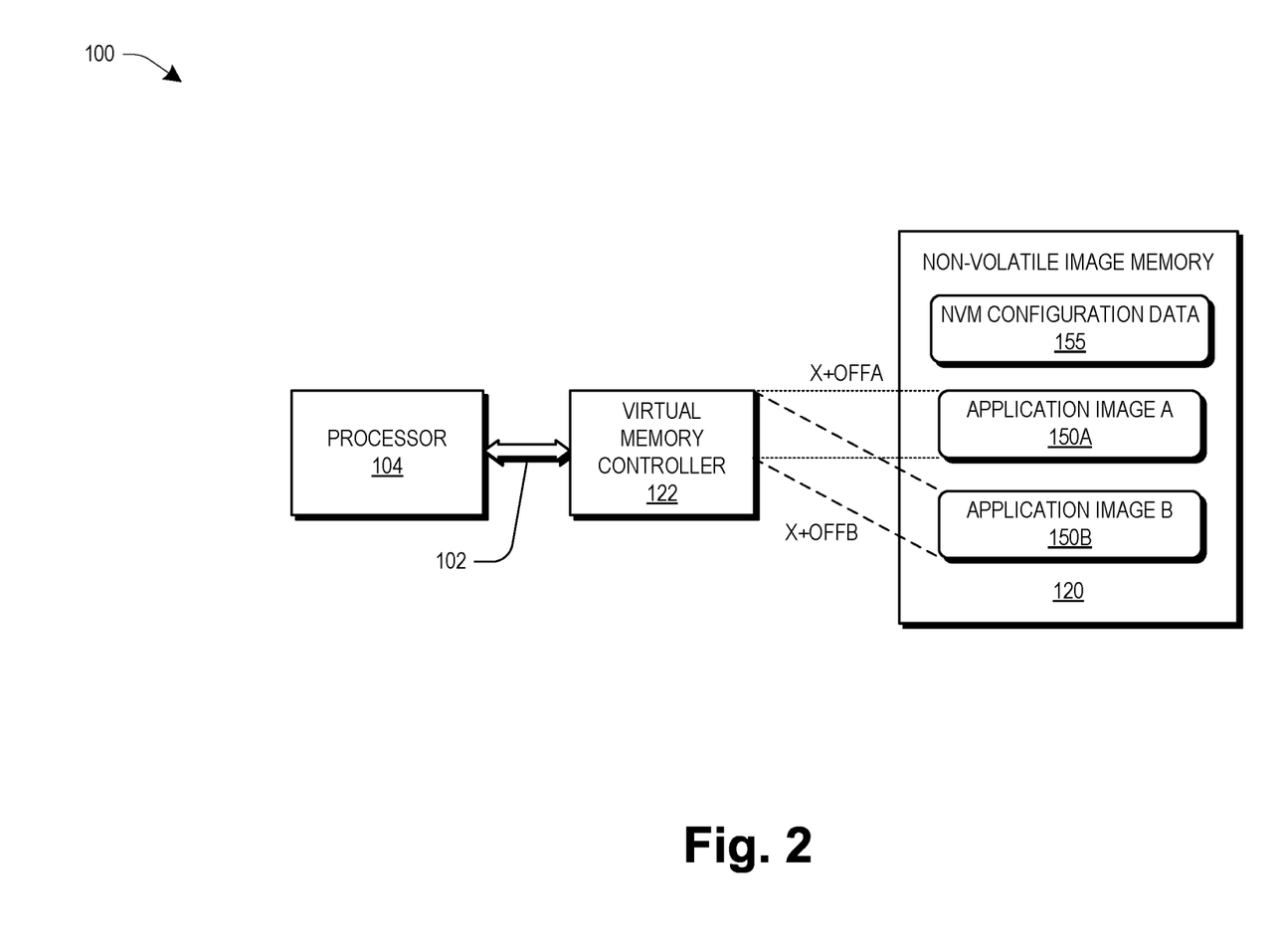
FIG. 2 is a diagram illustrating the processor, the virtual memory controller, and the non-volatile application image memory, in accordance with some embodiments.

Referring to FIG. 2, a diagram illustrating the processor 104, the virtual memory controller 122, and the non-volatile application image memory 120 is provided, in accordance with some embodiments. The non-volatile application image memory 120 stores multiple application images, such as an application image A 150A and an application image B 150B, and non-volatile memory (NVM) configuration data 155. The non-volatile application image memory 120 may store more than two application images. The NVM configuration data 155 may store state information associated with the application images, 150A, 150B, such as "active", "inactive", "updating", "version", or other suitable state data. In an embodiment where the non-volatile application image memory 120 comprises multiple physical devices, the non-volatile memory (NVM) configuration data 155 may be stored in a separate memory device than the application images 150A, 150B.

In an example, the non-volatile application image memory 120 may initially store two copies of a particular application image, where the application images 150A, 150B are identical. The system 100 may be configured, such as by configuring the NVM configuration data 155, to select one of the application images 150A, 150B as the active image. The processor 104 executes the active application image 150A or 150B. During an update process, at least a portion of the non-active application image may be updated or patched with a new version or patch data received over the communication interface 118 from a remote device or service. The new version or patch data may be received and validated while the processor 104 executes the active application image 150A or 150B. After completion of the update, the system 100 may be reset and the updated application image may be set as the active application image for execution by the processor 104. The previous version of the application image may be retained for some time period to allow for roll-back of the update or the updated application image may be copied over the previous version of the application image to provide a mirroring condition.

In some embodiments, the virtual memory controller 122 supports the processor 104 in accessing the active application image. The NVM configuration data 155 in the non-volatile application image memory 120 stores offset data for each of the application images 150A, 150B indicating the physical address of the particular application image 150A, 150B within the non-volatile application image memory 120. During the boot process, the virtual memory controller 122 is configured with the offset address of the active image. The processor 104 employs the base starting address of the application image 150A, 150B, regardless of the application image 150A, 150B designated as being active. The virtual memory controller 122 modifies transactions by the processor 104 to account for the offset associated with the starting physical address of the active application image 150A, 150B in the non-volatile application image memory 120. For example, if the processor 104 uses an address of X execute an instruction in the application image 150A, 150B, the virtual memory controller 122 adjusts the value of X according to the offset of the active application image 150A, 150B so that the address provided to the within the non-volatile application image memory 120 reflects the actual physical address of the active application image 150A in the non-volatile application image memory 120.

Figure 3:
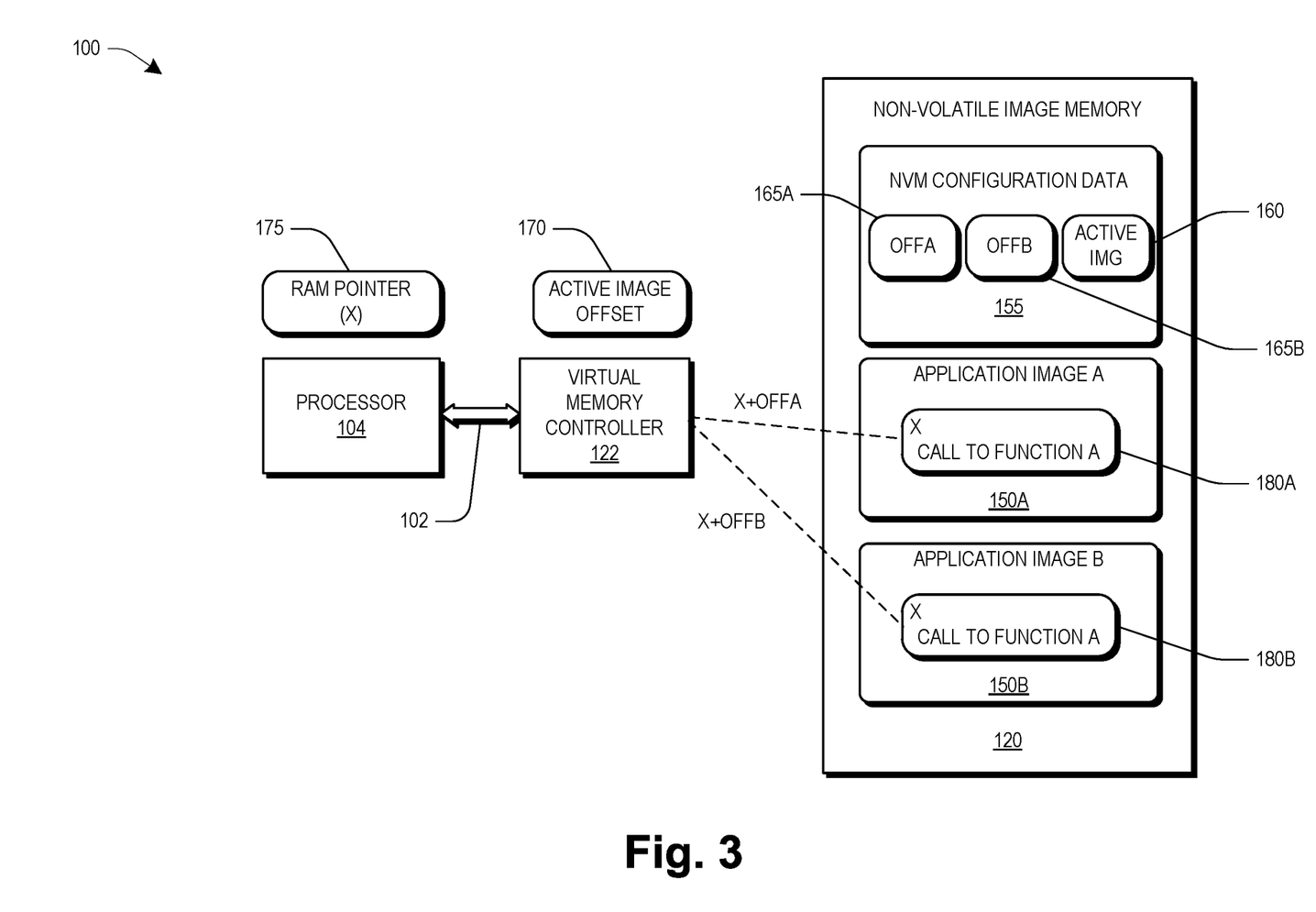
FIG. 3 is a diagram illustrating a function call by the processor to an application image in the non-volatile memory, in accordance with some embodiments.

FIG. 3 is a diagram illustrating a function call by the processor 104 to an application image 150A, 150B in the non-volatile application image memory 120, in accordance with some embodiments. During the initialization or booting of the system 100, the active application image 150A, 150B is indicated by an active image identifier 160 stored in the NVM configuration data 155. Each application image 150A, 150B has an offset parameter 165A, 165B stored in the NVM configuration data 155 indicating the difference between the base starting address of the application image and the starting physical address of the application image 150A, 150B in the non-volatile application image memory 120. In some embodiments, if the starting physical address of an application image 150A, 150B is the same as the base starting address, the offset parameter 165A, 165B may be zero. The virtual memory controller 122 is configured with an active image offset 170 corresponding to the offset parameter 165A, 165B of the active image.

In an example, the processor 104 employs a RAM pointer 175 that has a value of X. For example, the RAM pointer 175 may be an instruction pointer stored in the system memory 106 that indicates the next instruction to be executed in the application image 150A, 150B. The processor 104 provides the address, X, to the virtual memory controller 122. Assume the instruction at address X is a call to a function, A. The virtual memory controller 122 employs the active image offset 170 to adjust the instruction pointer. In the case where the application image 150A is active, the adjusted pointer becomes x+OFFA which corresponds to function A in the application image 150A. In the case where the application image 150B is active, the adjusted pointer becomes x+OFFB which corresponds to function A in the application image 150B.

In some embodiments, security measures are implemented to maintain the integrity of the application images 150A, 150B and to provide restrictions on accessing the NVM configuration data 155, the application images 150A, 150B, and the active image offset 170 provided to the virtual memory controller 122. In some embodiments, the application images 150A, 150B are digitally signed, and the base starting address is incorporated into the signature to prevent hacking by misaligning the image. Since the processor 104 uses the base stating address, which is later corrected by the virtual memory controller 122, the digital signature is unaffected and may be used to validate the application images 150A, 150B.

In some embodiments, the processor 104 employs an ARM (advanced RISC machine)-based processor architecture. In accordance with the ARM architecture, access rights for the processor 104 are set using a memory protection controller (MPC) or security attribution unit (SAU) based on the virtual address range and the SAU is locked. In some embodiments, access rights are controlled by the MPC connected to a bus master slave interface which uses physical addresses, so even if a virtual address is changed or MPU/SAU settings are modified, access to the non-volatile application image memory 120 is still protected by the MPC. The MPC configuration may also be locked. The MPC and SAU are standard modules under the ARM architecture which may be configured during the initialization or botting process. In some embodiments, the processor 104 locks the non-volatile application image memory 120 during the boot process. Other similar security measures may be implemented for other processor architectures.

Figure 4:
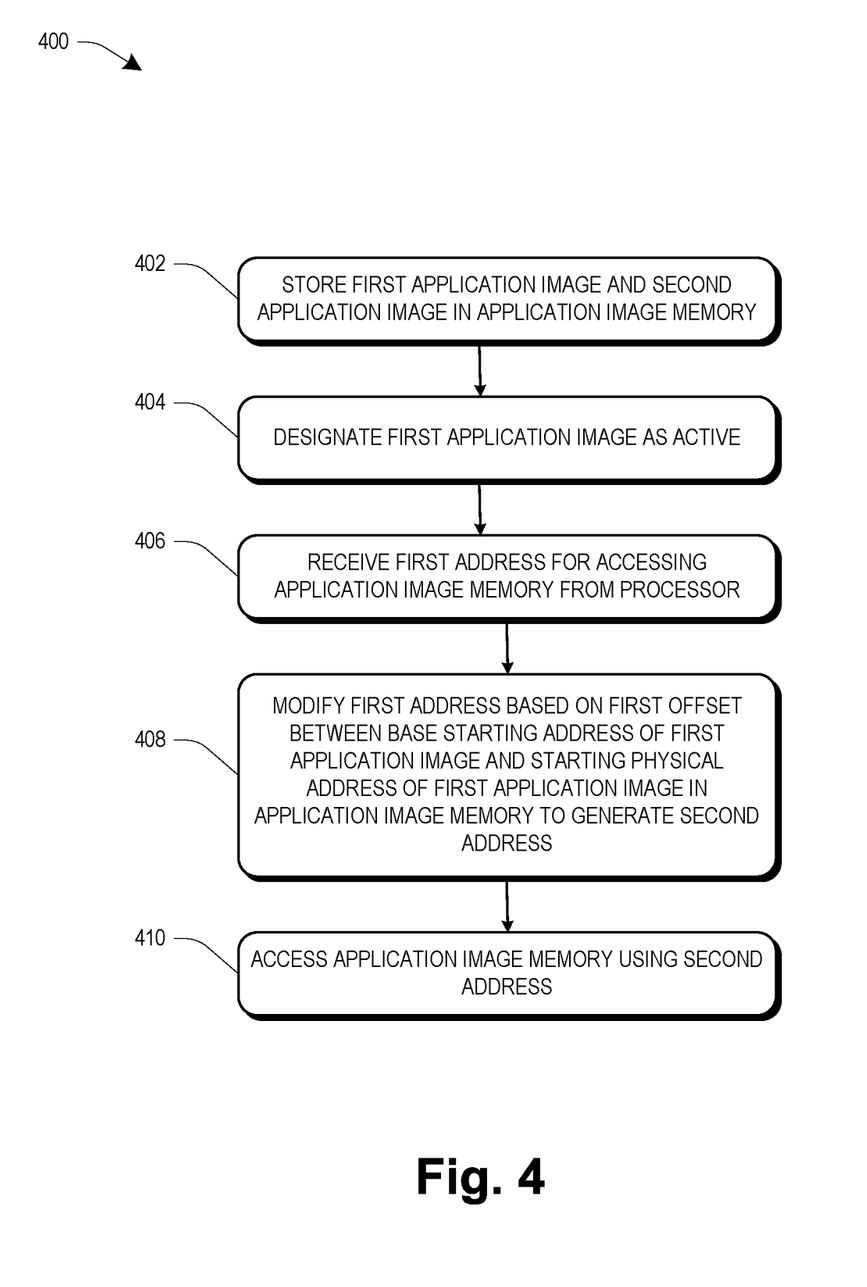
FIG. 4 is a flow chart illustrating an example method for using virtual addressing to execute application images, in accordance with some embodiments.

FIG. 4 is a flow chart illustrating an example method 400 for using virtual addressing to execute application images, in accordance with some embodiments. At 402, a first application image 150A and a second application image 150B are stored image in an application image memory 120. At 404, the first application image 150 is designated as active. At 406, a first address for accessing the application image memory 120 is received from a processor 104. At 408, the first address is modified based on a first offset between a base starting address of the first application image 150A and a starting physical address of the first application image 150A in the application image memory 120 to generate a second address. At 410, the application image memory 120 is accessed using the second address.

Figure 5:
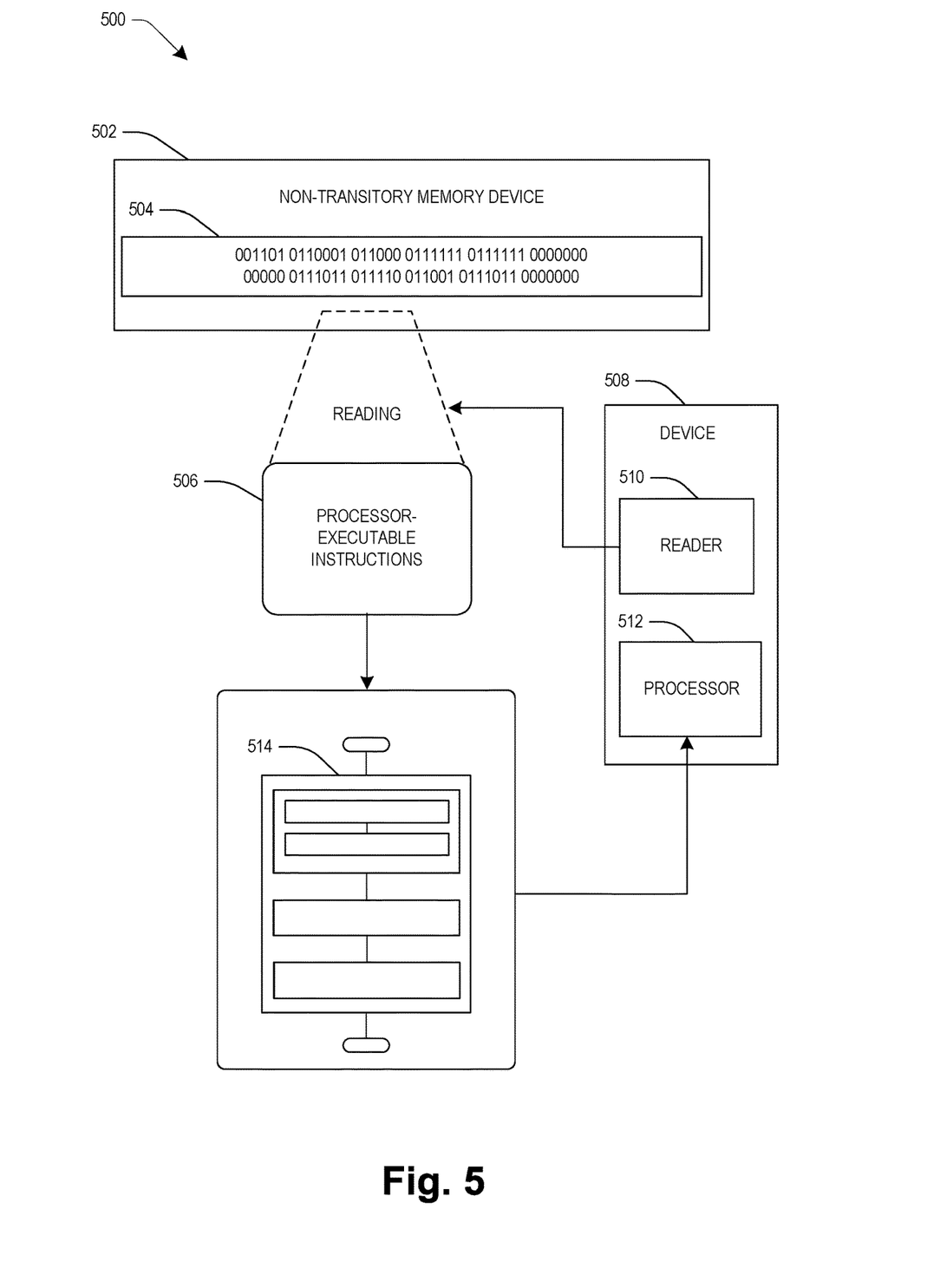
FIG. 5 illustrates an exemplary embodiment of a computer-readable medium, in accordance with some embodiments.

FIG. 5 illustrates an exemplary embodiment 500 of a computer-readable medium 502, in accordance with some embodiments. One or more embodiments involve a computer-readable medium comprising processor-executable instructions configured to implement one or more of the techniques presented herein, such as the method 400. The embodiment 500 comprises a non-transitory computer-readable medium 502 (e.g., a CD-R, DVD-R, flash drive, a platter of a hard disk drive, etc.), on which is encoded computer-readable data 504. This computer-readable data 504 in turn comprises a set of processor-executable computer instructions 506 that, when executed by a computing device 508 including a reader 510 for reading the processor-executable computer instructions 506 and a processor 512 for executing the processor-executable computer instructions 506, are configured to facilitate operations according to one or more of the principles set forth herein. In some embodiments, the processor-executable computer instructions 506, when executed, are configured to facilitate performance of a method 514, such as at least some of the aforementioned method(s). In some embodiments, the processor-executable computer instructions 506, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment of the techniques presented herein, a system is provided. The system comprises a processor, and an application image memory storing a first application image, a second application image, a first offset between a base starting address of the first application image and a physical starting address of the first application image in the application image memory, a second offset between a base starting address of the second application image and physical a starting address of the second application image in the application image memory, and an active image identifier indicating one of the first application image or the second application image as being an active application image. A virtual memory controller is configured to receive a first address for accessing the application image memory from the processor, modify the first address based on an active image offset to generate a second address, and access the memory based on the second address. The active image offset comprises the first offset responsive to the first application image being the active application image, and the active image offset comprises the second offset responsive to the second application image being the active application image.

In an embodiment of the techniques presented herein, the processor is configured to change the active image identifier indicating the one of the first application image or the second application image as being the active application image and modify the active image offset based on the first offset or the second offset.

In an embodiment of the techniques presented herein, the active image identifier indicates that the first application image is the active application image, and the processor is to replace the second application image with a third application image, change the active image identifier to indicate that the third application image is the active application image, and modify the second offset based on a base starting address of the third application image and a physical starting address of the third application image in the application image memory to generate a third offset, and modify the active image offset based on the third offset.

In an embodiment of the techniques presented herein, the processor is configured to replace the first application image with a copy of the third application image to generate a fourth application image and modify the first offset based on a base starting address of the fourth application image and a physical starting address of the fourth application image in the application image memory to generate a fourth offset.

In an embodiment of the techniques presented herein, the system comprises a system memory separate from the application image memory. The processor is to store a variable associated with the active application image in the system memory.

In an embodiment of the techniques presented herein, the system comprises a system memory separate from the application image memory. The processor is to store an instruction pointer in the system memory, and the instruction pointer comprises the first address.

In an embodiment of the techniques presented herein, the system comprises a system memory separate from the application image memory. The system memory comprises a volatile memory, and the application image memory comprises a non-volatile memory.

In an embodiment of the techniques presented herein, the application image memory comprises a non-volatile memory, and the processor is configured to lock the application image memory during a boot process of the system.

In an embodiment of the techniques presented herein, a system is provided. The system comprise means for storing a first application image and a second application image in an application image memory, mean for designating the first application image as active, means for receiving a first address for accessing the application image memory from a processor, means for modifying the first address based on a first offset between a base starting address of the first application image and a starting physical address of the first application image in the application image memory to generate a second address, and means for accessing the application image memory using the second address.

In an embodiment of the techniques presented herein, a method is provided. The method comprises storing a first application image and a second application image in an application image memory, designating the first application image as active, receiving a first address for accessing the application image memory from a processor, modifying the first address based on a first offset between a base starting address of the first application image and a starting physical address of the first application image in the application image memory to generate a second address, and accessing the application image memory using the second address.

In an embodiment of the techniques presented herein, the method comprises storing an active image identifier in the application image memory designating the first application image as active.

In an embodiment of the techniques presented herein, the method comprises designating the second application image as active, receiving a third address for accessing the application image memory from the processor, modifying the third address based on a second offset between a base starting address of the second application image and a starting physical address of the second application image in the application image memory to generate a fourth address, and accessing the application image memory using the fourth address.

In an embodiment of the techniques presented herein, the method comprises storing an active image identifier in the application image memory designating the second application image as active.

In an embodiment of the techniques presented herein, the method comprises configuring a virtual memory controller connected to the application image memory based on the first offset, receiving the first address in the virtual memory controller, modifying the first address in the virtual memory controller, and sending the second address to the processor from the virtual memory controller.

In an embodiment of the techniques presented herein, the method comprises replacing the second application image with a third application image, designating the third application image as active, receiving a third address for accessing the application image memory from the processor, modifying the third address based on a second offset between a base starting address of the third application image and a starting physical address of the third application image in the application image memory to generate a fourth address, and accessing the application image memory using the fourth address.

In an embodiment of the techniques presented herein, the method comprises replacing the first application image with a copy of the third application image to generate a fourth application image, and modifying the first offset based on a base starting address of the fourth application image and a fourth physical starting address of the fourth application image in the application image memory to generate a fourth offset.

In an embodiment of the techniques presented herein, the method comprises storing a variable associated with the first application image in a system memory separate from the application image memory.

In an embodiment of the techniques presented herein, the method comprises storing an instruction pointer in a system memory separate from the application image memory. The instruction pointer comprises the first address.

In an embodiment of the techniques presented herein, the method comprises locking the application image memory during a boot process. The application image memory comprises a non-volatile memory.

In an embodiment of the techniques presented herein, a system is provided. The system comprises means for storing a first application image in a non-volatile application image memory, means for storing a second application image in the non-volatile application image memory, means for storing in the non-volatile application image memory a first offset between a base starting address of the first application image and a first physical starting address of the first application image in the non-volatile application image memory, means for storing in the non-volatile application image memory a second offset between a base starting address of the second application image and a second physical starting address of the second application image in the non-volatile application image memory, means for storing in the non-volatile application image memory an active image identifier indicating one of the first application image or the second application image as being active, and means for configuring a virtual memory controller configured to modify a first address received from a processor to generate a second address for accessing the non-volatile application image memory based on the first offset responsive to the first application image being active or based on the second offset responsive to the second application image being active.

In an embodiment of the techniques presented herein, a method is provided. The method comprises storing a first application image in a non-volatile application image memory, storing a second application image in the non-volatile application image memory, storing in the non-volatile application image memory a first offset between a base starting address of the first application image and a first physical starting address of the first application image in the non-volatile application image memory, storing in the non-volatile application image memory a second offset between a base starting address of the second application image and a second physical starting address of the second application image in the non-volatile application image memory, storing in the non-volatile application image memory an active image identifier indicating one of the first application image or the second application image as being active, and configuring a virtual memory controller configured to modify a first address received from a processor to generate a second address for accessing the non-volatile application image memory based on the first offset responsive to the first application image being active or based on the second offset responsive to the second application image being active.

In an embodiment of the techniques presented herein, the method comprises storing an instruction pointer comprising the first address in a system memory separate from the non-volatile application image memory.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system, comprising:
a processor;
an application image memory storing a first application image, a second application image, a first offset between a base starting address of the first application image and a physical starting address of the first application image in the application image memory, a second offset between a base starting address of the second application image and a physical starting address of the second application image in the application image memory, and an active image identifier indicating one of the first application image or the second application image as being an active application image; and
a virtual memory controller configured to receive a first address for accessing the application image memory from the processor, modify the first address based on an active image offset to generate a second address, and access the application image memory based on the second address, wherein:
the active image offset comprises the first offset responsive to the first application image being the active application image, and
the active image offset comprises the second offset responsive to the second application image being the active application image.

2. The system of claim 1, wherein:
the processor is configured to change the active image identifier indicating the one of the first application image or the second application image as being the active application image and modify the active image offset based on the first offset or the second offset.

3. The system of claim 1, wherein:
the active image identifier indicates that the first application image is the active application image; and
the processor is to replace at least a portion of the second application image with a third application image, change the active image identifier to indicate that the third application image is the active application image, and modify the second offset based on a base starting address of the third application image and a physical starting address of the third application image in the application image memory to generate a third offset, and modify the active image offset based on the third offset.

4. The system of claim 3, wherein:
the processor is configured to replace the first application image with a copy of the third application image to generate a fourth application image and modify the first offset based on a base starting address of the fourth application image and a physical starting address of the fourth application image in the application image memory to generate a fourth offset.

5. The system of claim 1, comprising:
a system memory separate from the application image memory, wherein:
the processor is to store a variable associated with the active application image in the system memory.

6. The system of claim 5, comprising:
a system memory separate from the application image memory, wherein:
the processor is to store an instruction pointer in the system memory; and
the instruction pointer comprises the first address.

7. The system of claim 5, comprising:
a system memory separate from the application image memory, wherein
the system memory comprises a volatile memory; and
the application image memory comprises a non-volatile memory.

8. The system of claim 1, wherein:
the application image memory comprises a non-volatile memory; and
the processor is configured to lock the application image memory during a boot process of the system.

9. A method, comprising:
storing a first application image and a second application image in an application image memory;

designating the first application image as active;
receiving a first address for accessing the application image memory from a processor;
modifying the first address based on a first offset between a base starting address of the first application image and a starting physical address of the first application image in the application image memory to generate a second address; and
accessing the application image memory using the second address.

10. The method of claim 9, comprising:
storing an active image identifier in the application image memory designating the first application image as active.

11. The method of claim 9, comprising:
designating the second application image as active;
receiving a third address for accessing the application image memory from the processor;
modifying the third address based on a second offset between a base starting address of the second application image and a starting physical address of the second application image in the application image memory to generate a fourth address; and
accessing the application image memory using the fourth address.

12. The method of claim 11, comprising:
storing an active image identifier in the application image memory designating the second application image as active.

13. The method of claim 9, comprising:
configuring a virtual memory controller connected to the application image memory based on the first offset;
receiving the first address in the virtual memory controller;
modifying the first address in the virtual memory controller; and
sending the second address to the processor from the virtual memory controller.

14. The method of claim 9, comprising:
replacing the second application image with a third application image;
designating the third application image as active;
receiving a third address for accessing the application image memory from the processor;
modifying the third address based on a second offset between a base starting address of the third application image and a starting physical address of the third application image in the application image memory to generate a fourth address; and
accessing the application image memory using the fourth address.

15. The method of claim 14, comprising:
replacing the first application image with a copy of the third application image to generate a fourth application image; and
modifying the first offset based on a base starting address of the fourth application image and a fourth physical starting address of the fourth application image in the application image memory to generate a fourth offset.

16. The method of claim 9, comprising:
storing a variable associated with the first application image in a system memory separate from the application image memory.

17. The method of claim 9, comprising:
storing an instruction pointer in a system memory separate from the application image memory, wherein:
the instruction pointer comprises the first address.

18. The method of claim 9, comprising:
locking the application image memory during a boot process, wherein:
the application image memory comprises a non-volatile memory.

19. A method, comprising:
storing a first application image in a non-volatile application image memory;
storing a second application image in the non-volatile application image memory;
storing in the non-volatile application image memory a first offset between a base starting address of the first application image and a first physical starting address of the first application image in the non-volatile application image memory;
storing in the non-volatile application image memory a second offset between a base starting address of the second application image and a second physical starting address of the second application image in the non-volatile application image memory;
storing in the non-volatile application image memory an active image identifier indicating one of the first application image or the second application image as being active; and
configuring a virtual memory controller configured to modify a first address received from a processor to generate a second address for accessing the non-volatile application image memory based on the first offset responsive to the first application image being active or based on the second offset responsive to the second application image being active.

20. The method of claim 19, comprising:
storing an instruction pointer comprising the first address in a system memory separate from the non-volatile application image memory.

* * * * *